Jan. 14, 1930.    D. W. LAWS    1,744,006
ATTACHMENT FOR USE IN CONNECTION WITH CIRCULAR AND OTHER SAWS
Filed Aug. 31, 1928
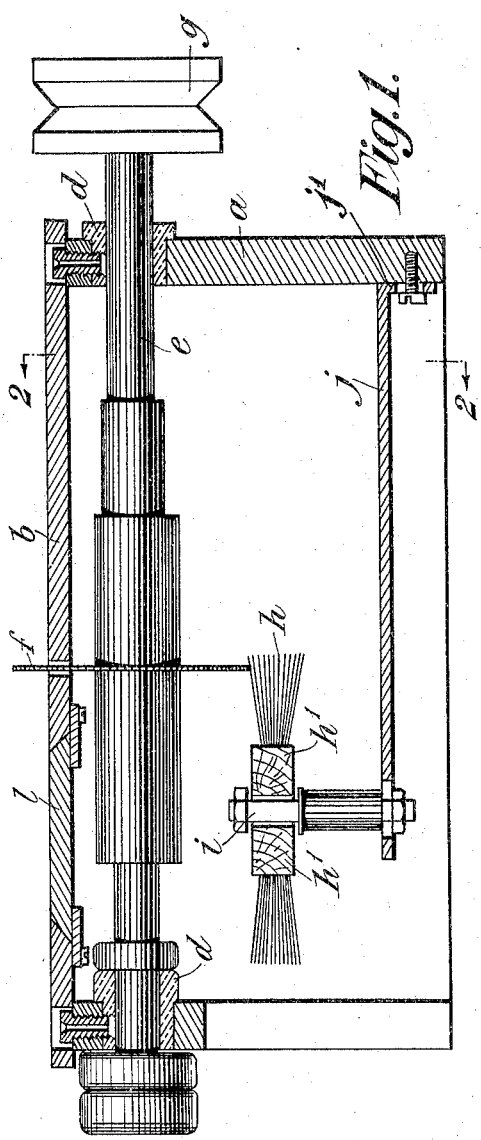
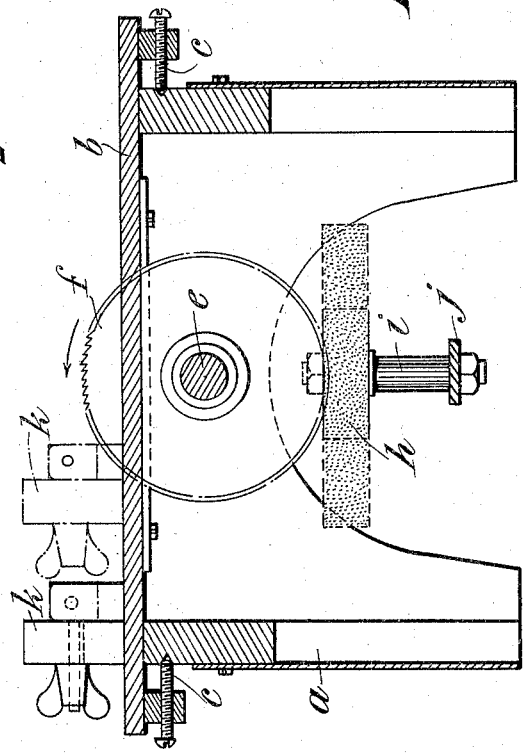
Inventor
David William Laws
By J. Kaplan
    Attorney Patented Jan. 14, 1930

1,744,006

UNITED STATES PATENT OFFICE

DAVID WILLIAM LAWS, OF LONDON, ENGLAND

ATTACHMENT FOR USE IN CONNECTION WITH CIRCULAR AND OTHER SAWS

Application filed August 31, 1928, Serial No. 303,336, and in Great Britain September 19, 1927.

This invention has for its object to prevent the clogging of the teeth of circular and other saws such as band-saws and milling cutters particularly those used for the cutting of lead and other soft metals. I have found that this clogging may be prevented by the use of a freely rotatable member of such a character and mounted in such relation to the saw or the like as to be engaged and rotated by the teeth of the same such interengagement between the two causing adhering particles to be positively pushed out from between the teeth of the saw milling cutter or the like. I have found that this may be effected by the use of a freely revolving circular brush so disposed relatively to the saw or the like that the teeth of the same pass at a tangent across and in contact with the bristles of the brush thereby causing the brush to revolve with the saw or the like.

Broadly the present invention consists of means for preventing the clogging of the teeth of saws, milling cutters and the like comprising a freely rotatable member adapted to be mounted in such relation to the saw or the like as to be engaged and rotated by the teeth of the same.

The invention also consists of means for preventing the clogging of the teeth of saws, milling cutters and the like comprising a freely rotatable circular brush adapted to be mounted in such relation to the saw or the like that its bristles penetrate between the teeth of the saw or the like the brush being thereby caused to rotate with the saw and to remove adhering particles from between the teeth of the same.

I have found that the best results are obtained when the brush is arranged with its axis parallel with the plane of the saw and its bristles as a consequence, at right angles to the teeth. The brush should be set to press firmly against the sides of the saw teeth so that the bristles are permitted to penetrate between the teeth, and for this purpose it may be supported by an adjustable mounting. Such a mounting is, however, not essential.

The brush should be mounted to revolve freely as otherwise the bristles will be cut by the saw teeth. Such brush may be used as a means for conveying lubricant to the saw teeth by feeding the lubricant for example, to the brush as it revolves, and incidentally it serves to prevent particles from being thrown off by the saw.

The improvements according to the present invention are particularly useful in connection with circular saws used for trimming and cutting lines of type, zincos and other blocks used for printing and to enable the invention to be carried into effect an apparatus of this character embodying the invention will now be described by aid of the accompanying drawings in which:—

Fig. 1 is a longitudinal part sectional elevation of an apparatus embodying the present invention for use in cutting metal type, blocks, etcetera.

Fig. 2 is a transverse section thereof on the line 2—2 of Fig. 1.

The apparatus illustrated comprises a frame $a$ serving as a support for a horizontal table $b$ which is adjustably secured thereto by means of screws $c$, see Fig. 2, which engage opposite sides of the frame for a purpose hereafter to be described.

Mounted within bearings $d$ carried by the frame $a$ is a spindle $e$ which carries, in known manner, a circular saw $f$. This saw, which projects through a slot in the table $b$ above it, is adapted to be driven, from any suitable source of power, through the medium of a belt pulley $g$ or other suitable and convenient means.

Located beneath the table $b$ is a circular brush $h$ the hub $h'$ of which is bored to receive a vertical spindle $i$ so that the brush is freely rotatable thereon. The spindle $i$ is carried by the frame $a$ in such relation to the saw $f$ that the bristles of the brush penetrate between the teeth of the saw in a transverse direction. For this purpose the axis of the spindle $i$ is at right angles to the axis of the saw spindle $e$. A suitable mounting for the spindle $i$ is illustrated in Fig. 1 of the drawings and comprises a resilient arm $j$ having a right angled extremity $j'$ which is bolted or otherwise secured to one of the vertical members of the frame *a* at the far end thereof.

By thus mounting the circular brush *h* in relation to the teeth of the saw the rotation of the saw serves to carry the brush round with it and in consequence of the penetration between the teeth of the saw of the bristles of the brush all adhering particles produced by the cutting operation are automatically removed.

Claims:

1. In a sawing machine, the combination of a frame and a saw, of means for removing particles from between its teeth comprising a freely rotatable member, flexible projections extending radially from said member, and means for supporting said freely rotatable member in a juxtaposition to the saw so that said flexible projections penetrate between the teeth of the saw transversely to the plane of the saw and cause such member to be thereby rotated, said supporting means consisting of a long resilient arm attached to the far end of said frame.

2. In a sawing machine the combination of a frame and a saw, of means for removing particles from between its teeth comprising a freely rotatable member, flexible bristles projecting radially from the circumference from the said member, and means for supporting said member in juxtaposition to the saw so that said bristles penetrate between the teeth of the saw transversely to the plane of the saw and cause such member to be thereby rotated, said supporting means comprising a long horizontally disposed arm so that the said freely rotating member will cause said arm to vibrate.

In testimony whereof I affix my signature.

DAVID WILLIAM LAWS.